Dec. 13, 1938.  A. G. SHERMAN  2,140,408
CABINET STOVE AND METHOD OF CONSTRUCTING AND ASSEMBLING
Filed Aug. 31, 1931  11 Sheets-Sheet 1

INVENTOR.
ALVIN G. SHERMAN.
BY
Barnes & Kisselle
ATTORNEYS

Dec. 13, 1938.  A. G. SHERMAN  2,140,408
CABINET STOVE AND METHOD OF CONSTRUCTING AND ASSEMBLING
Filed Aug. 31, 1931  11 Sheets-Sheet 5

INVENTOR.
ALVIN G. SHERMAN.
BY
Barnes & Kisselle
ATTORNEYS

Dec. 13, 1938.  A. G. SHERMAN  2,140,408
CABINET STOVE AND METHOD OF CONSTRUCTING AND ASSEMBLING
Filed Aug. 31, 1931  11 Sheets-Sheet 6

Dec. 13, 1938.   A. G. SHERMAN   2,140,408
CABINET STOVE AND METHOD OF CONSTRUCTING AND ASSEMBLING
Filed Aug. 31, 1931   11 Sheets-Sheet 7

INVENTOR
ALVIN G. SHERMAN
BY
Barnes & Kisselle
ATTORNEYS

Dec. 13, 1938.  A. G. SHERMAN  2,140,408
CABINET STOVE AND METHOD OF CONSTRUCTING AND ASSEMBLING
Filed Aug. 31, 1931   11 Sheets-Sheet 8

Fig. 11.

INVENTOR.
ALVIN G. SHERMAN.
BY
Barnes + Kisselle
ATTORNEYS

INVENTOR.
ALVIN G. SHERMAN.
BY
Barnes & Kissell
ATTORNEYS

Dec. 13, 1938.  A. G. SHERMAN  2,140,408
CABINET STOVE AND METHOD OF CONSTRUCTING AND ASSEMBLING
Filed Aug. 31, 1931   11 Sheets-Sheet 11

INVENTOR.
ALVIN G. SHERMAN.
BY
Barnes & Kissell
ATTORNEYS

Patented Dec. 13, 1938

2,140,408

UNITED STATES PATENT OFFICE 2,140,408

CABINET STOVE AND METHOD OF CONSTRUCTING AND ASSEMBLING

Alvin G. Sherman, Grosse Pointe, Mich., assignor, by mesne assignments, to Borg-Warner Corporation, a corporation of Illinois Application August 31, 1931, Serial No. 560,390

5 Claims. (Cl. 126—39)

This invention relates to a cabinet stove and method of constructing and assembling, and has to do particularly with ranges of the type wherein the grate is substantially level with the top of the oven and the entire range is enclosed in a cabinet or box-like construction.

In the last few years, it has become the general practice to procelain enamel substantially all of the exposed surfaces or panel sections of cooking stoves. In the fabrication and assembly of such stoves, it has been customary to utilize porcelain enameled panels as a real structural part of the stove itself; that is, such panels have formed a part of the assembly and have also formed reinforcing elements. Frame members have been utilized to some extent in combination with stove panels, but as shown in Patents No. 1,178,259 of April 4, 1916 and No. 1,537,032 of May 5, 1925, such frame members formed exposed parts of the stove and the panels still serve as reinforcing members.

It is an object of the present invention to fabricate a stove unit, particularly of the cabinet type, wherein the porcelain enameled panels are assembled independently of the frame structure, and which panels are so mounted as to serve as ornamental panels instead of structural elements of the stove. More specifically, I have provided a stove which is built from the inside out, in that I first fabricate a complete frame unit, all parts of which are concealed in the finally assembled stove, the lining being fitted solidly to the frame before the enameled panels are mounted on the frame.

Other features of the invention reside in a stationarily fitted back guard for the stove unit and a burner box cover movable and slidable to an inoperative position without disturbing the back guard.

A further feature resides in a combined drip pan and manifold cover forming an ornamental panel for the stove. A still further feature resides in a novel heat control assembly particularly adapted to the cabinet type stove unit.

Other features reside in various details of construction, including the slidable drawers, the top for holding the removable panels in place, the manner of insulating the oven unit, and other features as will be more clearly brought out in the specification and claims.

The present invention is applicable to cabinet type stoves of the type wherein substantially all of the surfaces are porcelain enamel coated. One of the greatest losses in the stove industry is due to the cracking and crazing of the enamel caused during shipment or during and after assembly, with the result that the stove usually has to be taken completely apart by experts and replaced with a new panel or part and the stove reassembled. To reduce the initial cost of assembly and to eliminate the necessity of tearing down the stove I have provided a completely concealed reinforcing framework which defines the contour of the stove and which reinforces and supports all of the parts of the stove whether fixed or slidable.

Figure 1:
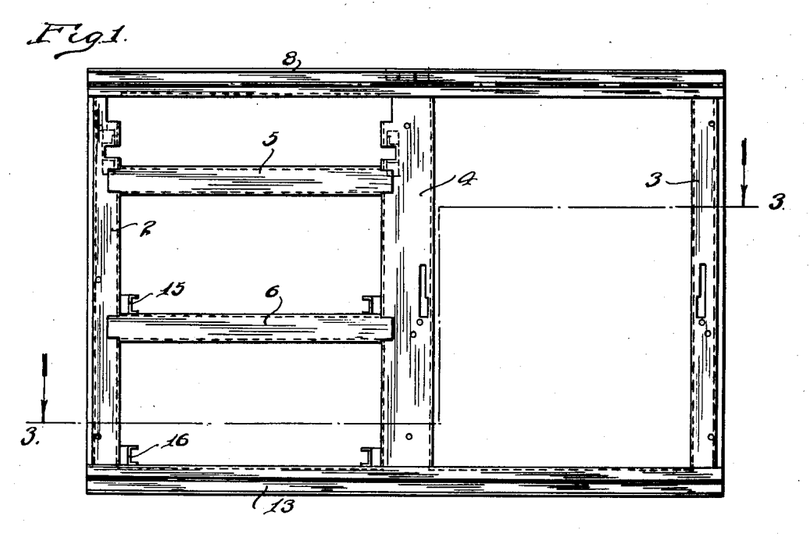
Fig. 1 is a front elevation of my reinforcing framework around which the stove proper is built.
Figure 2:
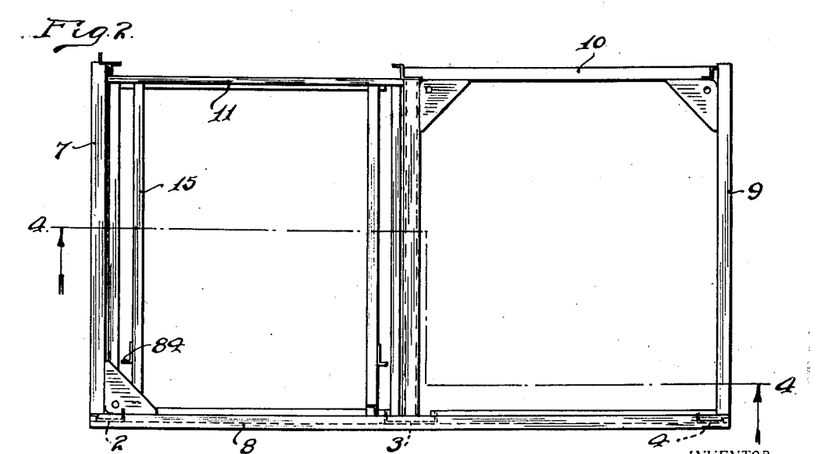
Fig. 2 is a plan view of the unit shown in Fig. 1.
Figure 3:
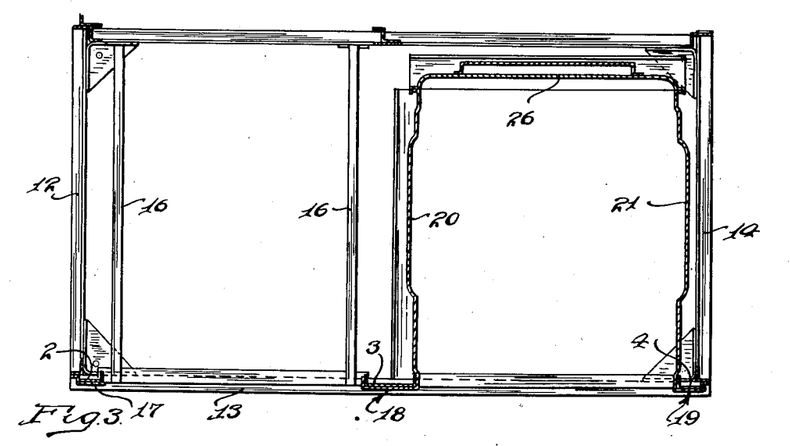
Fig. 3 is a sectional view taken on line 3—3 of Fig. 1 after the oven and broiler lining has been installed as a part of the complete frame.
Figure 4:
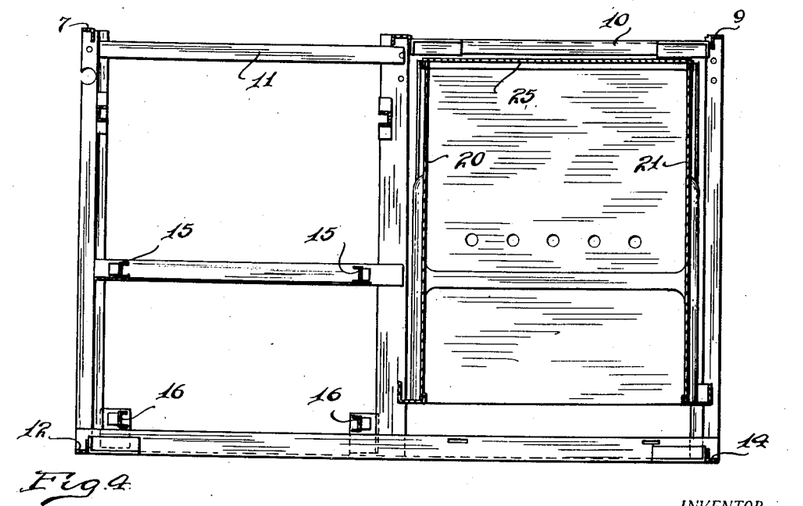
Fig. 4 is a sectional view taken on line 4—4 of Fig. 2, and illustrating the location of the sides and top of the oven and broiler lining as spaced within the reinforcing framework.

In Figs. 1 to 5 I have shown my reinforcing framework which consists of a plurality of channel or angle irons of predetermined length all welded together to form a complete reinforcing framework. The particular structure of the framework may obviously vary considerably and as shown in Fig. 1 I may use two front channel posts 2 and 3 and a relatively wide front center channel post 4. Cross braces 5 and 6 connect the channels 2 and 4. A suitable top frame consisting of the lengths 7, 8, 9 and 10 extends around the complete top of the framework with the exception of the rear part of the burner box. The rear top part of the burner box is formed of a separate member 11, as best shown in Figs. 2 and 4. The bottom members of the frame, particularly the front and two sides consist of outwardly extending angle irons 12, 13 and 14, the purpose and structure of which will be later described. Suitable channel irons 15 and 16 connect the front and back of the frame work and serve as guides for drawer units.

After the complete reinforcing framework has been welded together into a permanent unitary structure front frame members 17, 18, and 19 may be secured to the front of the channels 2, 3, and 4 forming the front posts of the framework. The front frame panels 18 and 19 are formed integrally as a part of the oven lining, as best shown in Fig. 3, the front frame panel 18 being formed as a continuation of the side panel lining 20 and the front frame panel 19 forming a continuation of the side lining 21. These front frame panels 17, 18 and 19 are preferably finished and serve as a finished cover for the reinforcing framework when the doors or drawers are opened. Such front frame panels are not visible except when the drawers or doors are open. Suitable frame panels 22 and 23 are used to cover the cross members 5 and 6 and another panel member 24 is adapted to be secured to the two front posts 3 and 4 to separate the oven and broiler and form a finished surface which is visible when the broiler door is in open position.

The remainder of the lining, consisting of the top 25, and the back member 26, is secured in position, the same being true of the panel members 17, 22, 23, 24 and the gas manifold 27. Suitable braces 28 are secured to the lower part of the framework to serve as leg-receiving members. The inside and the complete reinforcing part of the stove is thus formed as a complete internal unit, none of the parts of which are exposed in the final stove, but all the parts of which serve as the sole reinforcing means for the stove.

Figure 8:
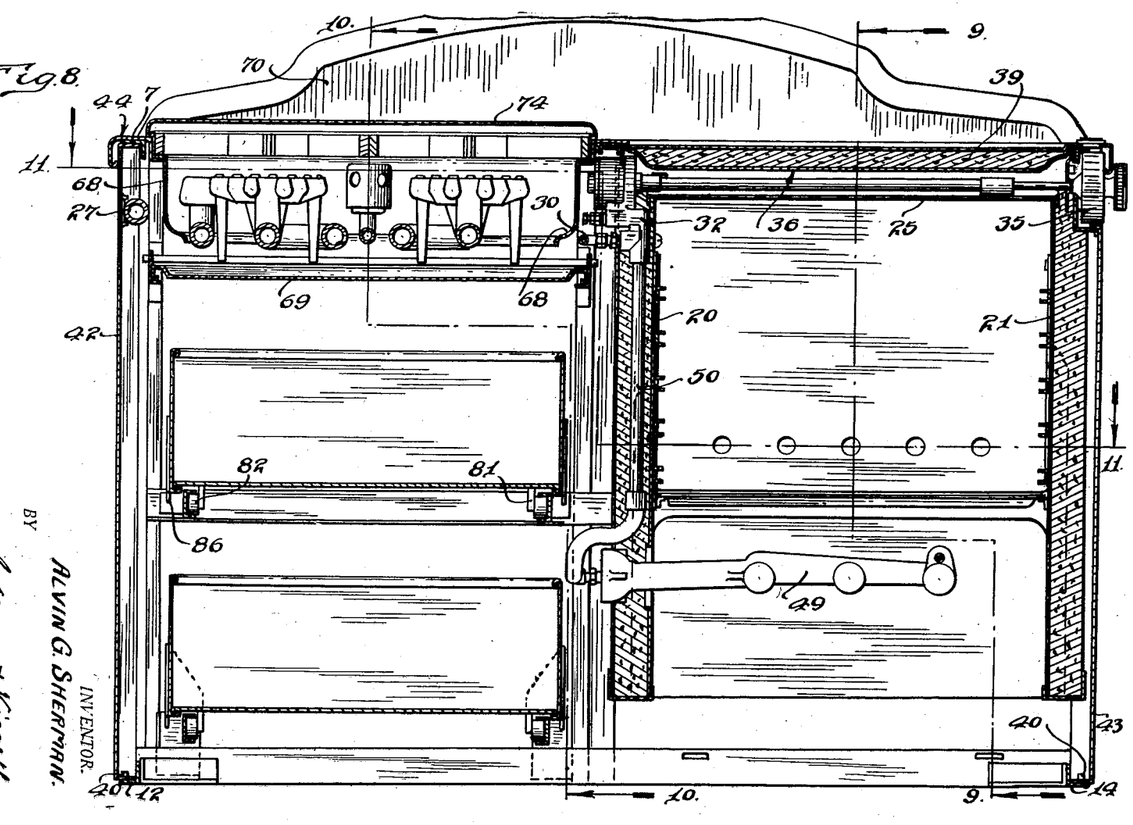
Fig. 8 is a sectional view taken on line 8—8 of Fig. 16 and illustrating the completely assembled stove parts and showing in particular the arrangement and combination between the heat control and the stove structure.
Figure 11:
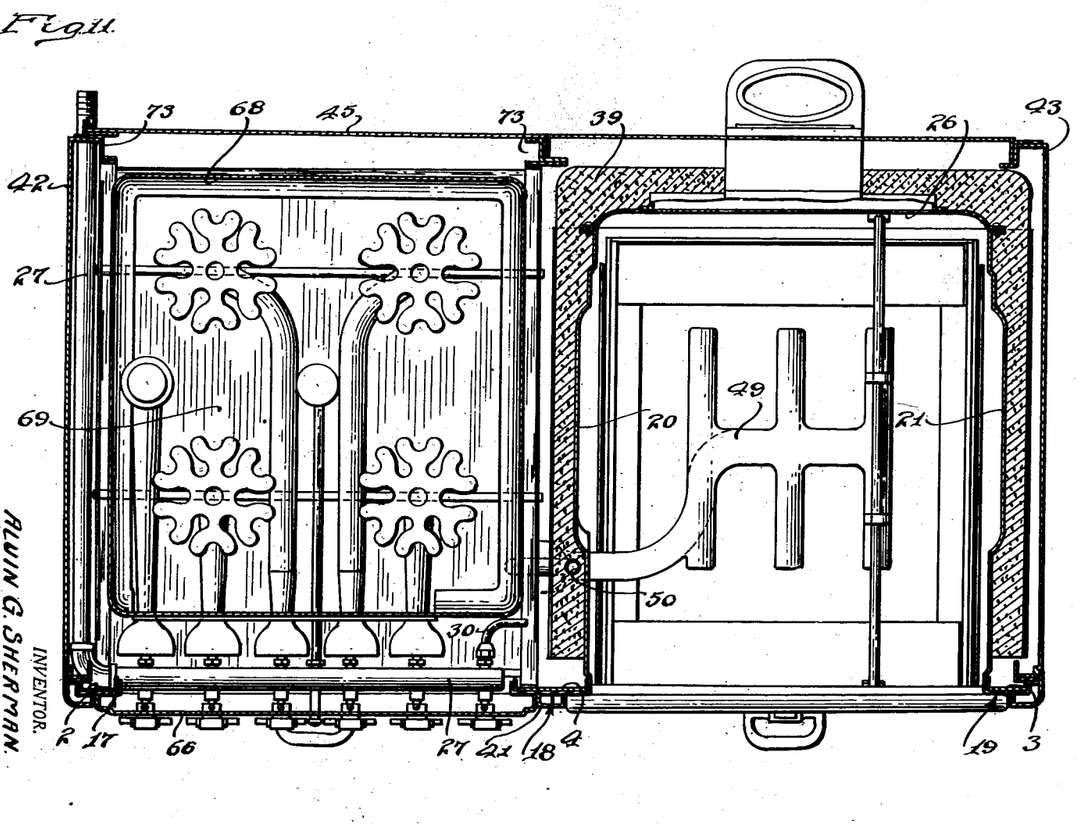
Fig. 11 is a sectional view taken on line 11—11 of Fig. 8.
Figure 21:
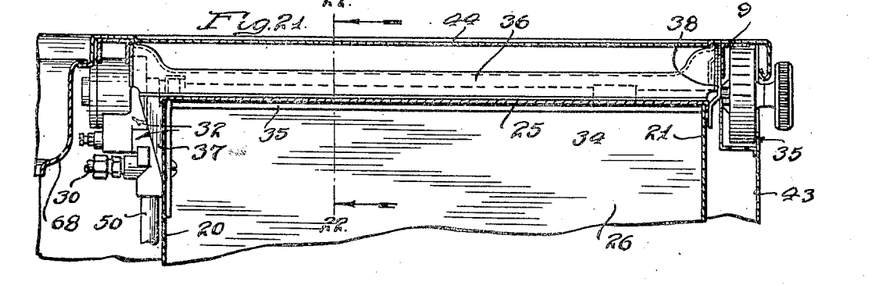
Fig. 21 is a sectional view taken on line 21—21 of Fig. 18 after the oven lining, heat control and top have been mounted in position.
Figure 22:
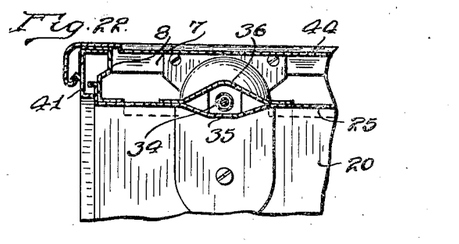
Fig. 22 is a sectional view taken on line 22—22 of Fig. 21.
Figures 23, 24, 25, 26:
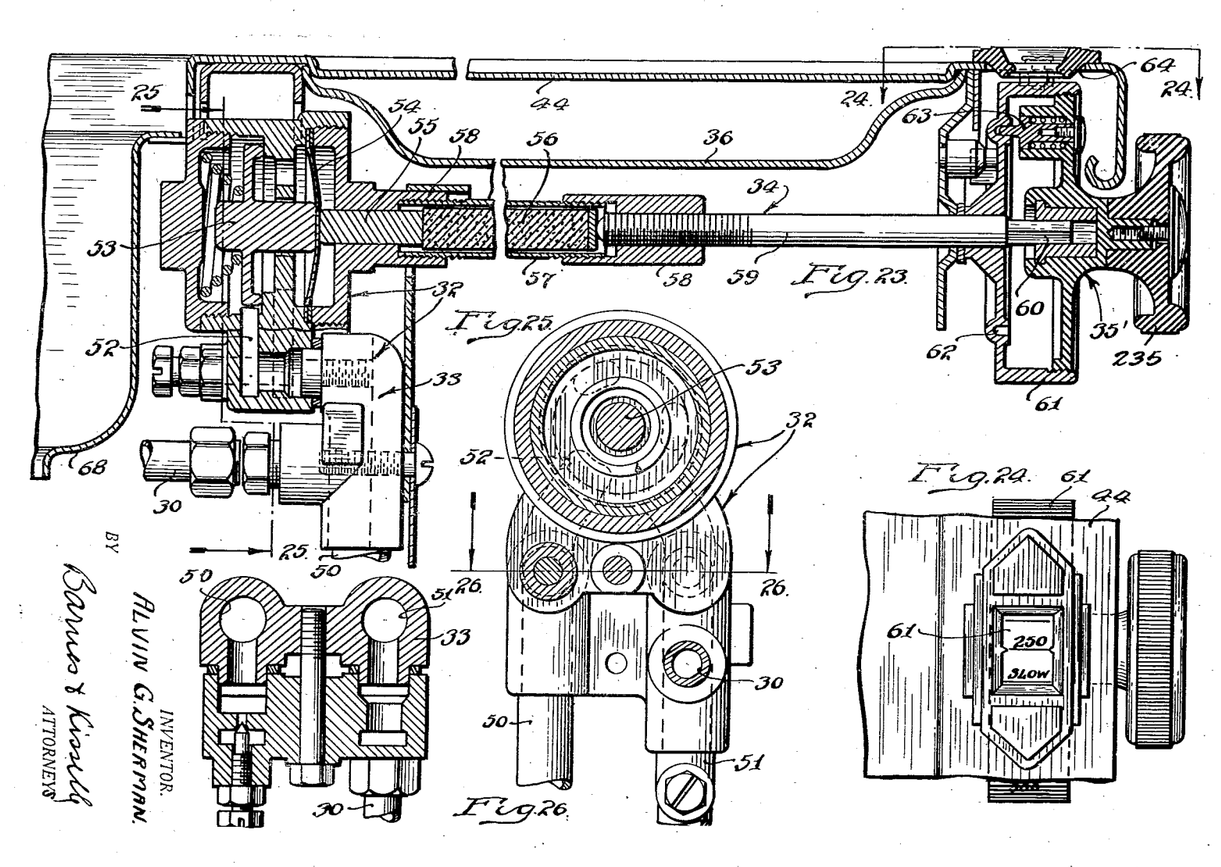
Fig. 23 is an enlarged sectional view of that portion of the heat control unit and cooperating parts of the stove as shown in Fig. 8.
Fig. 24 is a fragmentary plan view taken on line 24—24 of Fig. 23.
Fig. 25 is a sectional view taken on line 25—25 of Fig. 23.
Fig. 26 is a sectional view taken on line 26—26 of Fig. 25.

The next step in the preferred assembly of the stove consists in the mounting of the heat control unit, as is best illustrated in Fig. 8 and Figs. 18 to 23. As shown in Fig. 11 a branch conduit 30 leads from the main manifold 27, and this conduit 30 is adapted to be connected to a combined manifold and valve housing unit generally designated 32. The manifold portion 33 of the unit 32 may be braced or reinforced by mounting the same to the lining, as best illustrated in Figs. 8 and 23.

The coupling unit generally designated 34 may then be mounted above a suitable depression 35 formed into the top 25 of the oven lining; this coupling unit being designed to connect the valve housing unit 32 and the thermostat control unit generally designated 35'. Coincident with the assembly of this coupling unit, a guard or shield 36 may be mounted to the molded framework; suitable brackets 37 and 38 also being mounted at the end of the shield 36. Fig. 22, a sectional view taken on line 22—22 of Fig. 21, illustrates the assembly between the top part of the oven lining, the thermostat coupling, and the shield member.

Figure 5:
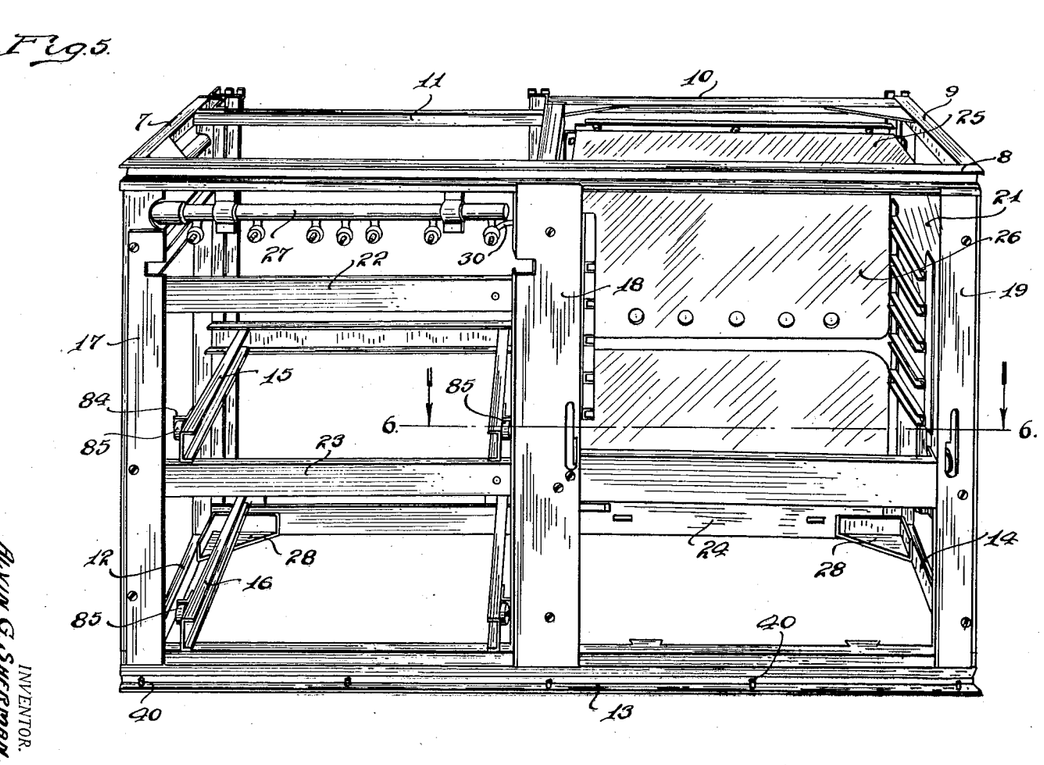
Fig. 5 is a perspective view of the complete reinforcing framework all welded together for detachably receiving the panels and drawers for completing the stove.
Figure 6:
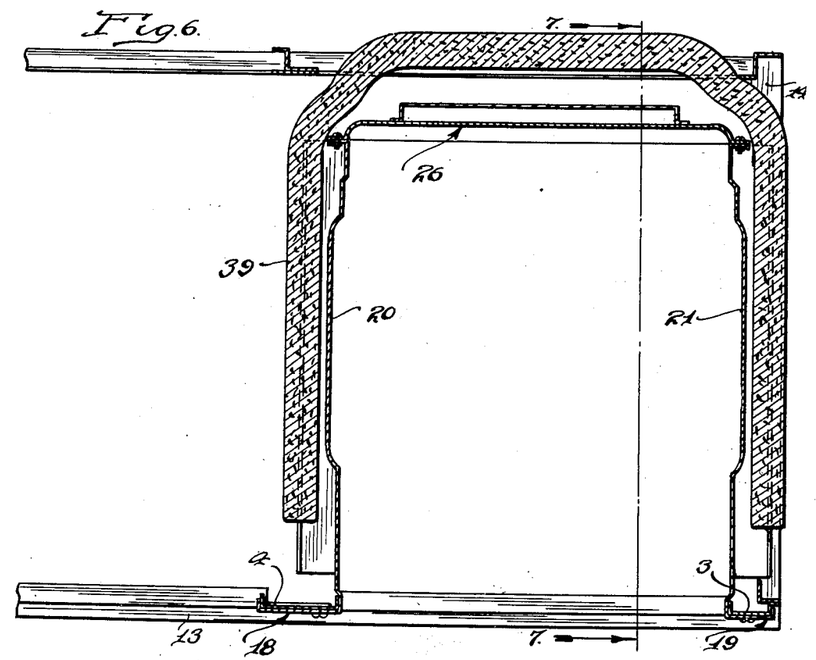
Fig. 6 is a sectional view taken on line 6—6 of Fig. 5 and illustrating the manner of applying the insulation around the oven lining walls prior to assembly of the ornamental panels.
Figure 7:
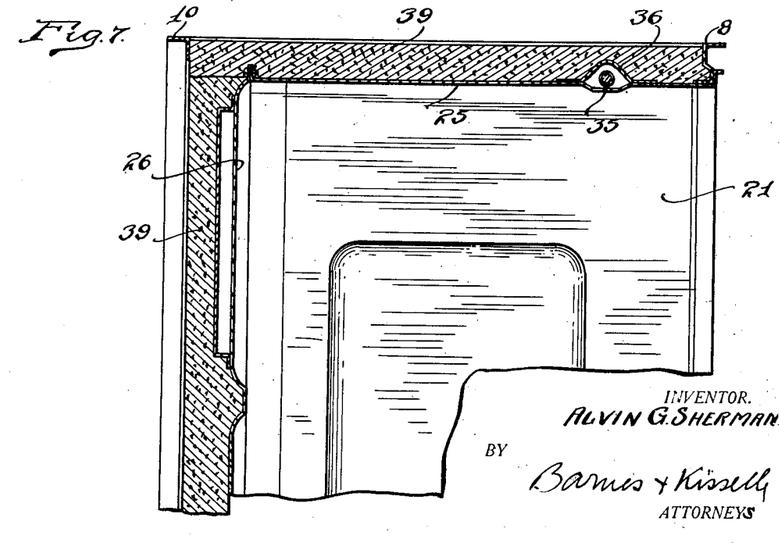
Fig. 7 is a sectional view taken on line 7—7 of Fig. 6 and illustrating the manner of applying the insulation to the top and back walls of the oven lining.

With the framework welded together, as shown in Fig. 5, and with the heat control unit assembled as shown in Fig. 8, the next step is to insert insulating material 39 around the oven lining and over the shield member 36. Inasmuch as the entire framework is open the placing of this insulating material around the oven and broiler lining is a very simple operation.

Figure 15:
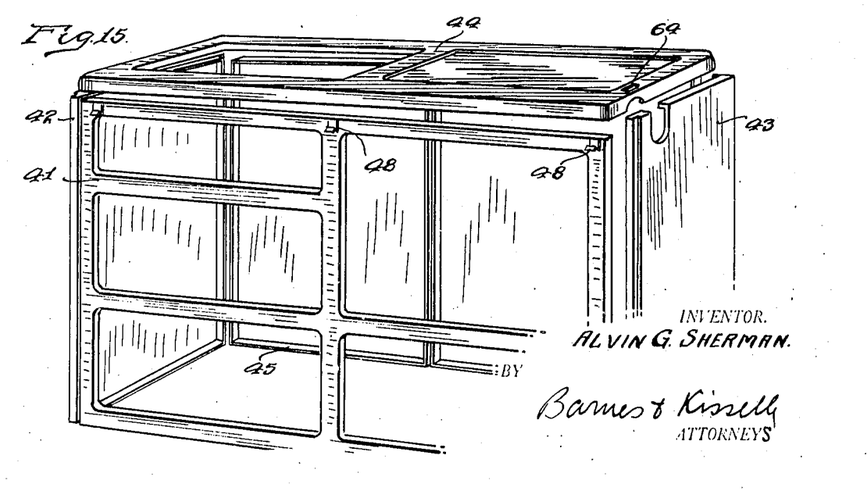
Fig. 15 is a perspective view illustrating the relative positions the various panels assume just before being assembled to the main frame structure.

The next main step in the assembly of the stove unit is the assembly of the porcelain enameled panels. The framework shown in Fig. 5 is adapted to support and position all of the various elements of the stove including the doors and drawers. The bottom members 12, 13 and 14 of the frame as well as the back bottom member of the frame are provided with a plurality of spaced locating and positioning pins 40. The panels, as best shown in Fig. 15, consist of a front panel member 41, end panels 42 and 43; top frame panel 44 and a rear panel 45.

Figures 10, 13, 14:
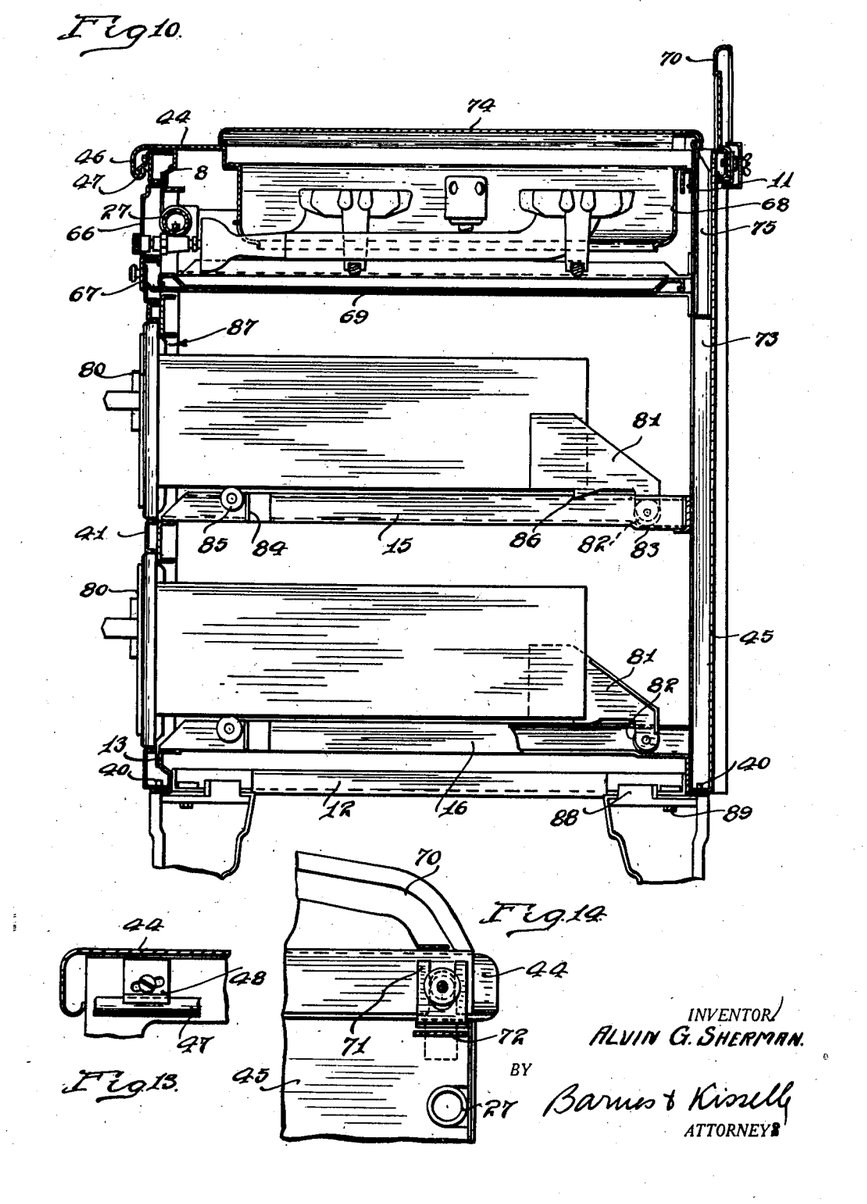
Fig. 10 is a sectional view taken on line 10—10 of Fig. 8.
Fig. 13 is a sectional view taken on line 13—13 of Fig. 12.
Fig. 14 is a sectional view taken on line 14—14 of Fig. 12.

As is best illustrated in Fig. 8, referring particularly to the end panel 42, it will be noted that each panel has an inturned top flange and an inturned lower flange. The lower flange of each panel is provided with a plurality of apertures which are adapted to register with the locating pins 40 carried by the lower frame of the stove unit. In assembling the panels, the side panels are assembled first and in so doing it is necessary to position the lower portion of each panel by positioning the apertures of the lower flange thereof over the corresponding locating pins 40 whereupon the panel may be swung through the remaining few degrees about the pins 40 as a hinge. Each panel is designed to fit fairly close within the framework, and after this temporary assembly of each side panel in its position the top panel 44 is assembled so as to positively lock or position each side panel in place. As best shown in Fig. 10, the top panel 44 is provided with a downwardly extending front flange 46 which terminates in a curled lower edge 47. In assembling this top panel, such panel is so placed that the curled lower edge 47 engages the underside of a plurality of lugs 48 which are secured to the top of the front panel 41. After such engagement between the curled lower edge and the underside of the lugs, the top panel may be lowered in place to encompass all the side panels.

It will thus be seen that all the exposed porcelain enameled panels may be readily and quickly assembled to the welded frame unit, and that these panels are so held in position that they serve as ornamental panels solely and are not subjected in any way to any reinforcing or supporting strains. If a panel should be damaged in any way it is only necessary to remove the top and disengage the particular panel from its position and replace the same as an individual unit. When any of the doors or drawers are open, the structural work of the frame unit is concealed from view by the base panels 17, 18 and 19.

Where the burner box is positioned below the top of the oven it is a comparatively simple matter to locate the heat control unit so as to make the same easily mounted and readily accessible and to also conserve the amount of piping required. However, with a cabinet stove of the type illustrated in the drawings the temperature regulator member must be positioned at some other point than has heretofore been customary in the old type of gas range. Instead of locating the temperature regulator unit at the side of the oven adjacent the burner box, I have located the same at the opposite side of the oven, but I have retained the control valve at approximately the same position as has been standard in the past. In doing this I have not only provided a very compact and positive acting heat control but have eliminated a large amount of piping which would otherwise be necessary. Attempts have been made to locate the heat control unit entirely at the outside of the oven, but in such various arrangements the use of piping going around the burner and back to the heat control has necessitated an added cost of from $1.00 to $2.00 as compared with my heat control unit and piping arrangement as illustrated in Fig. 8. In fact, by my arrangement I reduce the amount of piping to less than that required for standard heat control units wherein the burner box has been positioned below the oven top.

A suitable burner unit 49 may be positioned as shown in Fig. 8, and I prefer to utilize but a single pipe 50 for connecting the valve and manifold unit 32 with the burner. A pilot conduit 51 may connect the conduit 30 with the burner, but the only conduit for conducting gas between the thermostatically controlled valve unit 32 and burner 49 is the conduit 50. After passing through the manifold 33 the gas supply is taken into the valve proper through the port 52. The valve assembly is along standard lines and it consists of a spring pressed valve member 53, a diaphragm 54 permitting the valve to be loosely mounted and to seat freely, and a pin 55 serving as a connecting means between the valve 53 and one of the heat responsive elements 56. The outer heat responsive element 57 has a threaded relationship with the valve housing, as at 58, and the other end of this responsive element 57 is connected by means of a suitable union or coupling element 58 to the actuating rod 59. The end of the rod 59 has a square shank 60 adapted to engage with the temperature control wheel 235 whereby the rod 59 may be actuated. The end of the rod 59 has considerable play within the wheel 235 so that after the valve 53 has been opened by actuation of the rod 59 the expansion of the outer heat responsive element 57 will be taken care of by this play between the rod 59 and the wheel 235, allowing the valve to close.

The temperature wheel control 235 has a threaded engagement with a drum 61 containing suitable temperature graduations. This drum is provided with circumferentially spaced sockets 62 adapted to receive a spring pressed plunger 63 to permit of suitable calibrations between the control wheel 235 and the heat responsive elements.

The top panel member 44 is apertured as at 64 to provide a visible opening for the temperature graduations on the drum 61, as best shown in Fig. 4. By this arrangement the temperature regulator wheel or operating member is located so as to be very convenient to the operator and away from the burner box, the heat responsive elements are located at a very desirable position adjacent the top lining of the oven; the heat responsive elements serve as a direct connecting means between the actuating member of the heat control and the valve member, and the valve member and housing are so located as to require no extra piping than that required if there were no heat control member present.

Figure 16:
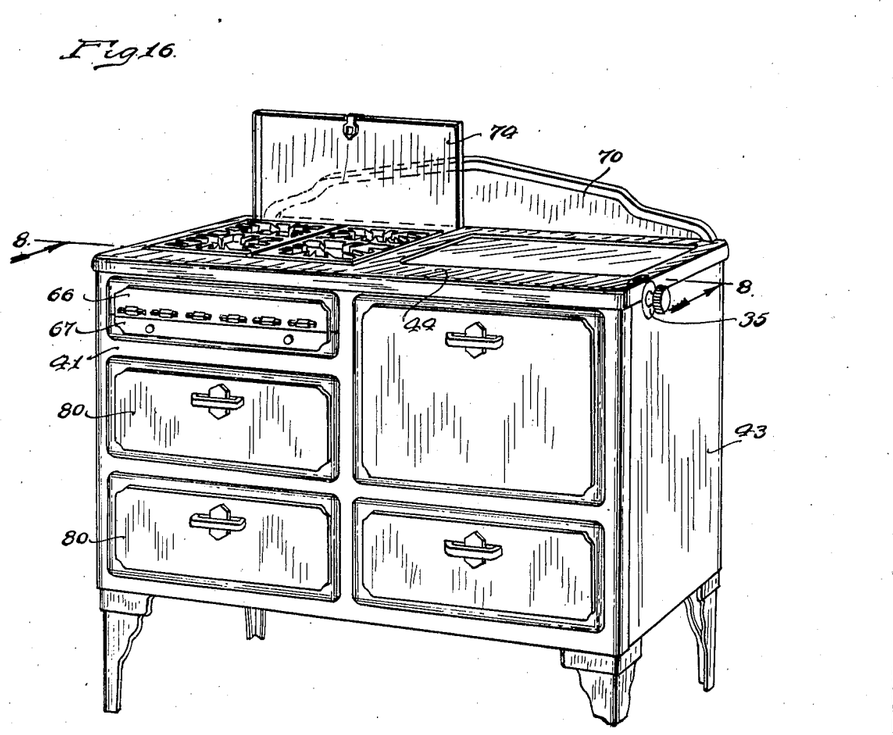
Fig. 16 is a perspective view of the completed stove unit.
Figure 18:
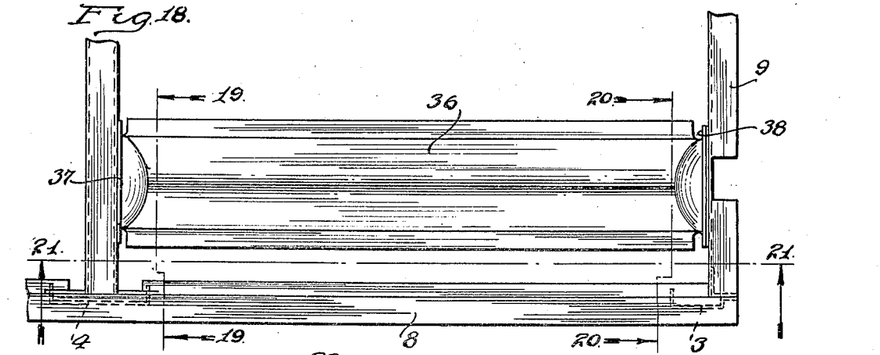
Fig. 18 is a fragmentary plan view of the front part of the oven frame after the heat control support and shield has been inserted in place.
Figure 19:
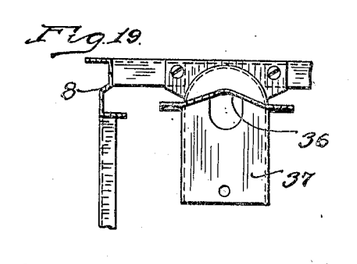
Fig. 19 is a sectional view taken on line 19—19 of Fig. 18 and showing one end of the supporting member for the heat control unit.
Figure 20:
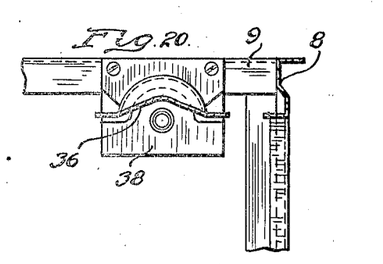
Fig. 20 is a sectional view taken on line 20—20 of Fig. 18 and illustrating the manner of mounting the other end of a heat control shield member.

As best shown in Figs. 10 and 11 the burners are provided with suitable valves connected to the manifold 27, and a manifold cover 66 and front 67 of a drip pan 69 are combined to form an ornamental panel, as best illustrated in Fig. 16. The drip pan 66 may be removed through the front of the stove as it is slidably supported on channel members forming a part of the frame. As best shown in Fig. 8 the side wells 68 of the burner box converge inwardly to a point within the periphery of the drip pan 69.

As best shown in Figs. 9, 10, 12 and 16 the stove is provided with a stationarily fitted back guard member 70. The bottom part of this back guard member is provided with a channel shaped flange 71 adapted to fit around the rear flange of the top panel member 44, and as shown in detail in Fig. 12, a clamp construction 72 is utilized for clamping the back guard member in position.

As shown in Figs. 10 and 11, the structural frame member is so formed as to provide oppositely positioned channels or guideways 73, which guideways are positioned at the rear of the burner box. As shown in Fig. 16, a burner box cover 74 completes the top symmetry of the stove, and this burner box cover is designed to be vertically slidable within the guideway 73 without disturbing the back guard 70. The burner box cover is shown in its closed position in Fig. 10, and in a half disappearing position in Fig. 16. A guide member 75 is hingedly connected to the burner box cover as shown in Fig. 10. The guideways 73 are provided with suitable stops (not shown) for positioning the burner box cover, as shown in Fig. 16, for allowing the same to be lowered to a completely concealed position, as in the space defined by the guideways 73.

The drawer members 80 are similar in construction, and as shown in Figs. 8 and 10, each drawer member is provided at the rear with supporting legs 81 carrying rollers 82. The channels 15 and 16 are slightly offset at their rear end, as at 83, so as to form a gravity stop for the drawer unit whereby this drawer is automatically maintained in closed position. Each of the channel members 15 and 16 are provided at their front end with a stop member 84, and just ahead of this with a roller 85. The rollers 85 support the drawer when in closed position, as shown in Fig. 10, whereby practically the complete weight of the drawer is received by the rollers 82 so that as these rollers pass by the offset part 83 of the channels the weight of the drawer will operate to maintain the same in a closed position. In moving the drawer outwardly the roller 82 will of course follow in the channel 15 or 16 until the projection 86 contacts with the stop 84. If it is desired to remove the drawer entirely from the stove there is enough space between the top of the drawer and the opening in the front frame, as at 87, so that if the drawer is lifted up bodily the projection 86 will clear the stop 84 and permit removal of the drawer.

Figures 9, 12, 17:
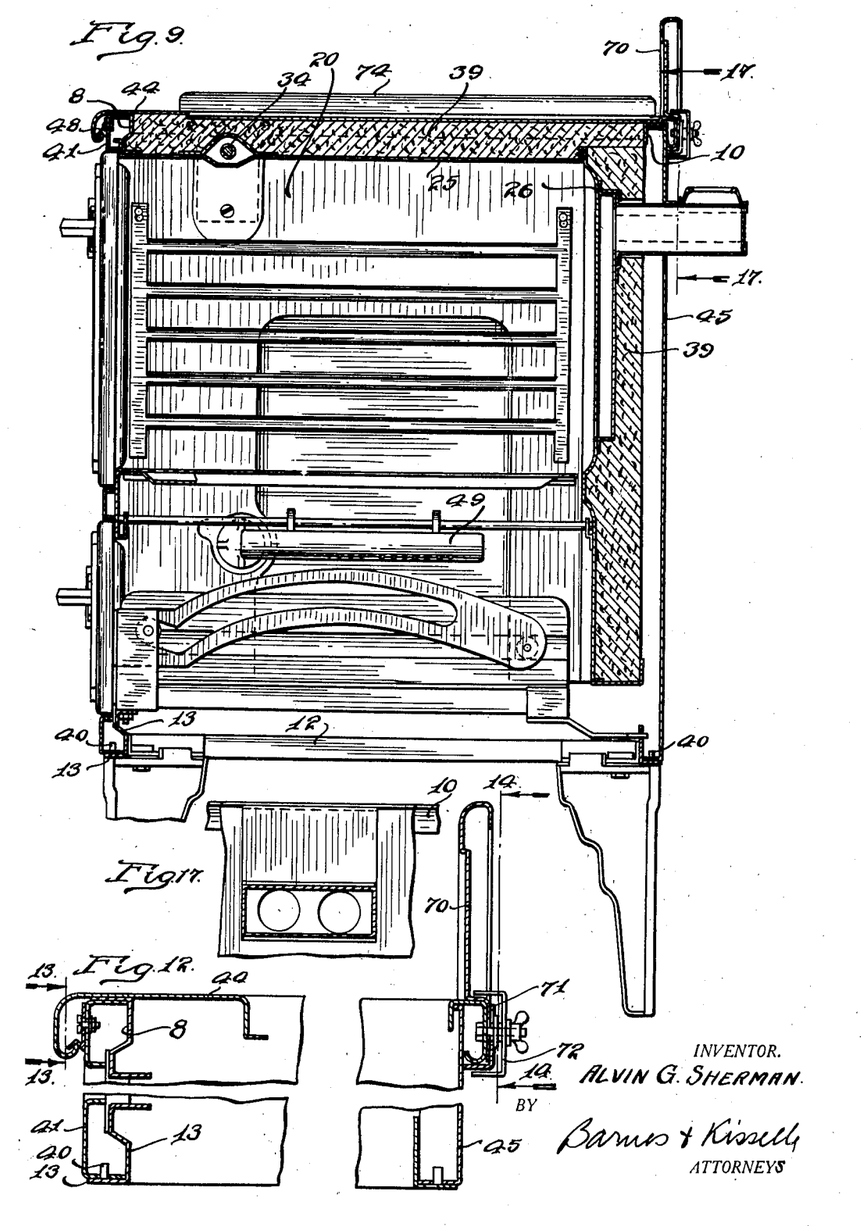
Fig. 9 is a sectional view taken on line 9—9 of Fig. 8.
Fig. 12 is an enlarged fragmentary sectional view illustrating the manner of assembling the front and back panels to the reinforcing frame and the detailed structure of the top for holding the panels in place.
Fig. 17 is a sectional view taken on line 17—17 of Fig. 9.

Any suitable leg members may be secured to the stove frame either before or after the enameled panels have been positioned in place, but in Figs. 9 and 10 I have shown the preferred manner of securing the leg member into position wherein each leg member is provided with a suitable positioning lug 88 adapted to cooperate with the members 28 whereby when bolts 89 are tightened the lug members 88 will correctly position and hold the legs in place.

I claim:

1. Cabinet structure comprising an inner framework including front posts, exterior panels including a unitary front panel directly supported by and concealing the framework, closure members and auxiliary panels positioned back of said front panel and in front of said posts for covering said posts for concealing the same from view when the closure members are open.

2. Cabinet structure comprising an inner framework including front posts, exterior panels including a unitary front panel directly supported by and concealing the framework, closure members, a lining secured to said framework, and panels positioned back of said front panel and in front of said posts and forming a continuation of said lining for covering said posts to conceal the same from view when the closure members are open.

3. Cabinet stove structure comprising an oven, a burner box, the top of which is substantially level with the top of the oven, a drip pan positioned beneath the burner box, a manifold at the front of the burner box, oven and broiler door panels, and a general ornamental panel for covering said manifold and front of said drip pan, said general panel being formed in two parts, an upper part being fixedly positioned and having valve handles protruding therethrough and a lower part secured to the drip pan and slidable outwardly of the stove, said lower part when in closed position cooperating with the upper portion to form a single ornamental panel unit.

4. Enameled cabinet structure comprising an outer unit of ornamented panels, and an inner unit consisting of structural steel framework for supporting the various parts of cabinet, each of said panels being partially interfitted with and supported by said inner unit and positioned partially to conceal the same, movable closure members positioned to conceal frame portions not covered by said panels, and auxiliary panels secured to the framework by removable fastening means for concealing the framework when said closure members are open.

5. Cabinet stove structure comprising a burner box, a drip pan positioned beneath the burner box, a general panel for the front of said burner box and drip pan, said panel being formed in two parts, one part being fixedly positioned and having controls projecting therethrough, and a second part secured to the drip pan and slidable outwardly of the stove, said two parts cooperating in closed position to form a single ornamented panel unit.

ALVIN G. SHERMAN.